R. McCORD, Jr., & G. W. ALEXANDER.
Portable Derrick.
No. 207,292. Patented Aug. 20, 1878.
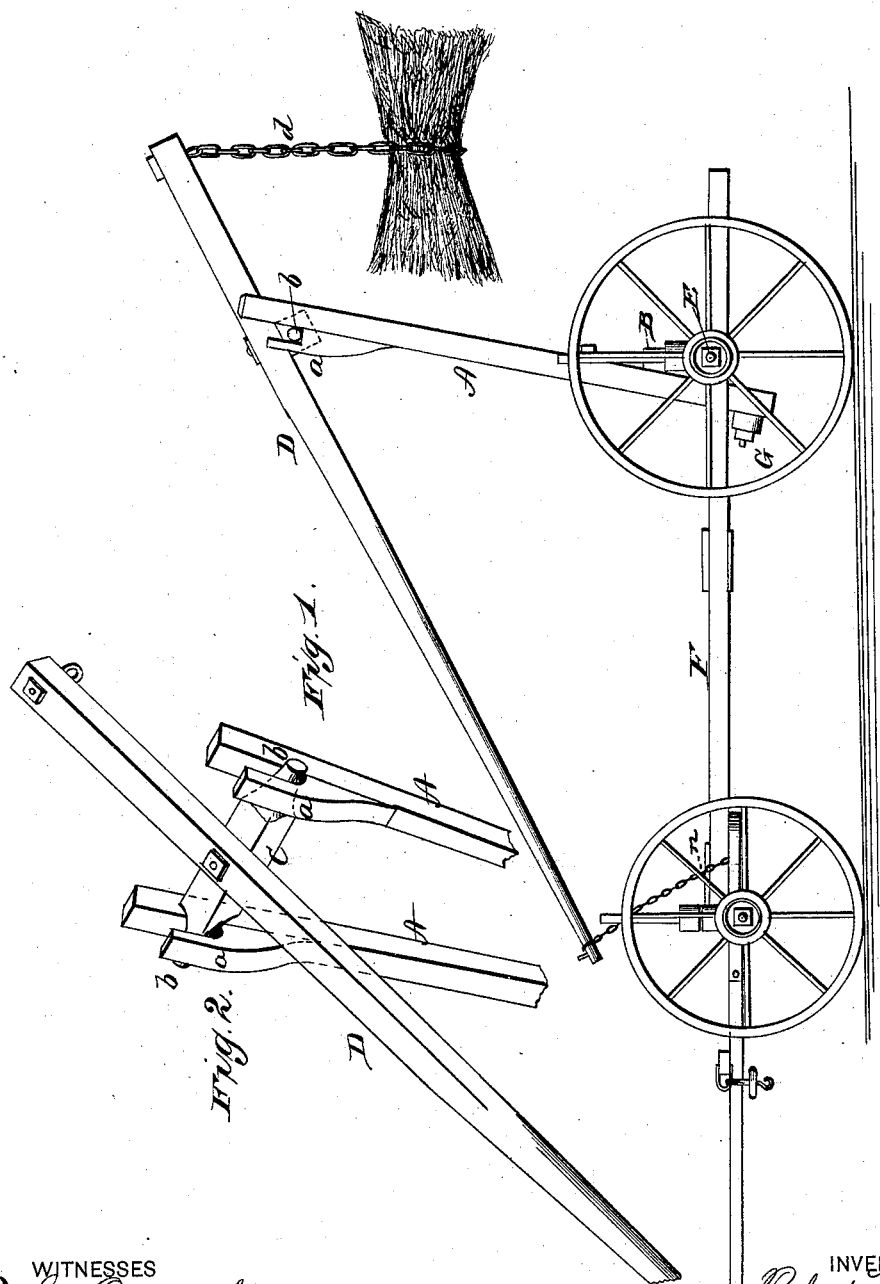

UNITED STATES PATENT OFFICE.

ROBERT McCORD, JR., AND GEORGE W. ALEXANDER, OF VINCENNES, IND.

IMPROVEMENT IN PORTABLE DERRICKS.

Specification forming part of Letters Patent No. 207,292, dated August 20, 1878; application filed July 25, 1878.

*To all whom it may concern:*

Be it known that we, ROBERT McCORD, Jr., and GEORGE W. ALEXANDER, of Vincennes, in the county of Knox, and in the State of Indiana, have invented certain new and useful Improvements in Device for Confining Fodder and Stalks on Vehicles; and do hereby declare that the following is a full, clear, and exact description thereof, reference being had to the accompanying drawings, and to the letters of reference marked thereon, making a part of this specification.

The nature of our invention consists in the construction and arrangement of a device for hauling shocks of corn or other fodder from the field, as will be hereinafter more fully set forth.

In order to enable others skilled in the art to which our invention appertains to make and use the same, we will now proceed to describe its construction and operation, referring to the annexed drawings, in which—

Figure 1 is a side elevation of our invention mounted upon an ordinary farm-wagon. Fig. 2 is a detailed view of a part of the invention.

A A represent two uprights of any suitable dimensions, which are placed in such a manner that their lower ends will be somewhat closer together than their upper ends, and said uprights are connected by a cross-bar, B, a suitable distance above their lower ends. At or near the upper ends of the uprights A A are formed open hooks or bearings $a\,a$ to receive the journals $b\,b$ of a cross-bar or shaft, C. To the center of this cross-bar or shaft is secured the lever D.

The lower ends of the posts A A are passed downward in front of the hind axle, E, and straddling the reach F of any ordinary farm-wagon, so that the cross-bar B will rest upon the hind bolster of the wagon. Below the reach the lower ends of the uprights are connected by a cross-bar, G, the ends of which project under the rear hounds. The structure is then secured in any suitable manner to the wagon, so as to be firm and steady.

The lever D is at its ends provided with chains $d$ and $n$, as shown, the chain $d$ being used for attaching to the shock of fodder, and the chain $n$ for raising the same and connecting the lever to the front part of the wagon.

By this machine the farmer can move shocks of fodder, with or without corn on, without tearing them to pieces, and set them in their right positions. The machine may also be used for moving rock or other heavy articles in the same manner.

Having thus fully described our invention, what we claim as new, and desire to secure by Letters Patent, is—

The combination of the inclined uprights A A, connected by the cross-bars B G, and formed with the open hooks or bearings $a\,a$, the rock-shaft C with journals $b\,b$, and lever D with chains $d\,n$, all arranged upon a wagon, substantially as and for the purposes herein set forth.

In testimony that we claim the foregoing we have hereunto set our hands this 4th day of July, 1878.

ROBERT McCORD, JR.
GEORGE W. ALEXANDER.

Witnesses:
WILL C. JOHNSON,
GEO. G. REILY.